(No Model.)
W. H. KNIGHT.
DYNAMO ELECTRIC MACHINE OR MOTOR.
No. 523,668. Patented July 31, 1894.
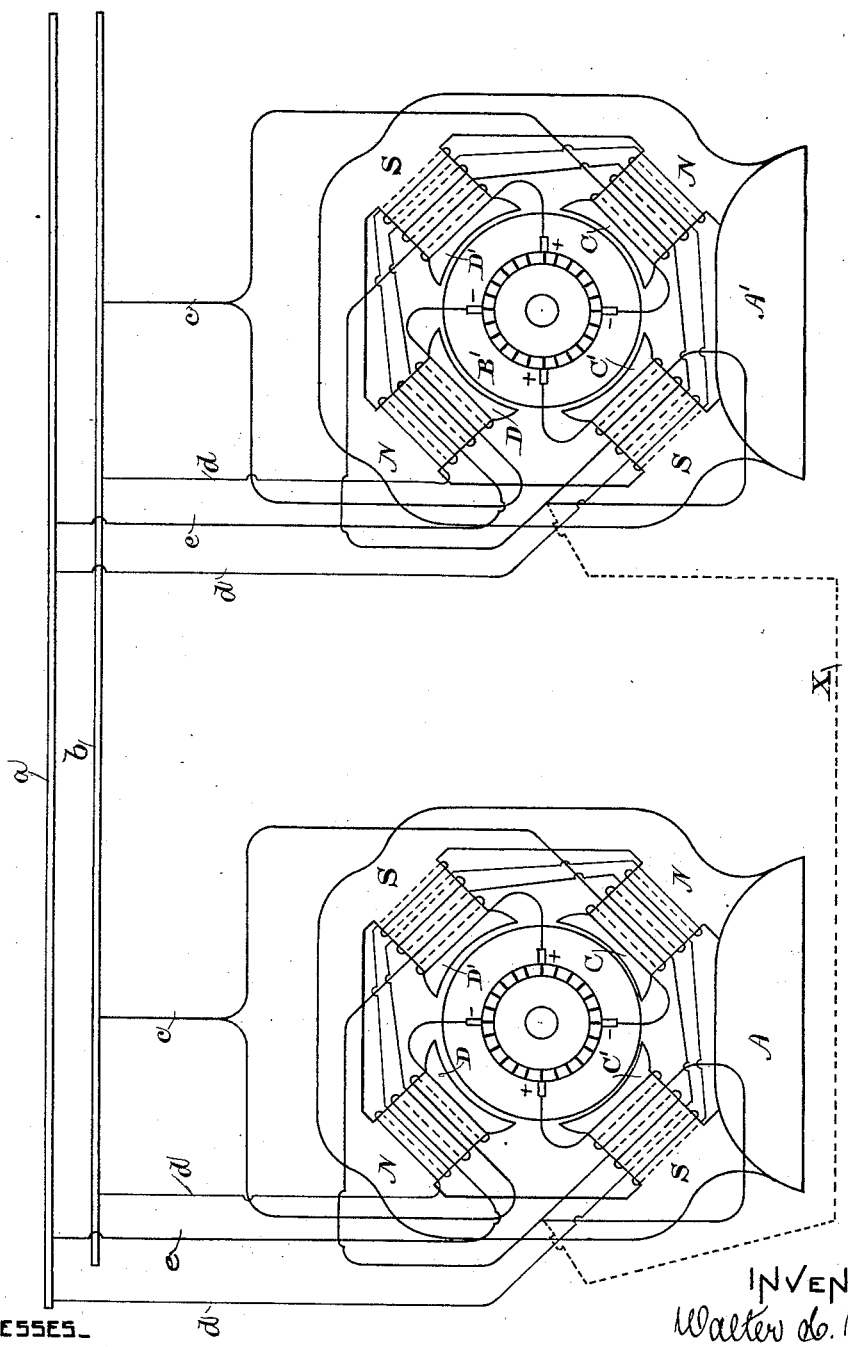
Witnesses—
A. F. Macdonald.
T. J. Johnston.
Inventor—
Walter H. Knight by
Bentley and Blodgett,
Attys.

UNITED STATES PATENT OFFICE.

WALTER H. KNIGHT, OF LYNN, ASSIGNOR TO THE GENERAL ELECTRIC COMPANY, OF BOSTON, MASSACHUSETTS.

DYNAMO-ELECTRIC MACHINE OR MOTOR.

SPECIFICATION forming part of Letters Patent No. 523,668, dated July 31, 1894.

Application filed January 9, 1894. Serial No. 496,237. (No model.)

*To all whom it may concern:*

Be it known that I, WALTER H. KNIGHT, a citizen of the United States, and a resident of Lynn, county of Essex, and State of Massachusetts, have invented certain new and useful Improvements in Dynamo-Electric Machines or Motors, of which the following is a specification.

My invention relates to dynamo-electric machines or motors and particularly those of the multipolar type, and has for its object to provide a method and means of compounding which shall serve to counteract the effect of any eccentricity in the armature by which its distance from the different pole pieces is caused to vary; by which means also I preserve an equality of potential between the different parts of the armature, so that the electro-motive forces generated in each part are equal, and the armature is not unduly heated in any part thereof.

In an ordinary multiple-wound armature running in a field having more than one pair of poles, there is a tendency, should the armature approach more closely to one pole than to another either from eccentricity in its construction or from a bending of the shaft supporting it or from its bearings getting out of line, to generate a higher electro-motive force in the part of the armature which is nearest the pole faces, giving rise to injurious heating; it is manifest that a heat which when distributed around the whole body of the armature or through every part of its coils would have no bad effect, if all concentrated at one place, may be sufficient to char the insulation; the resistance of the coils rising as they become heated, the more the heat generated is localized the greater will be the amount of heat developed in the particular locality from such increase of resistance, and these effects may become greatly exaggerated. In practice this has been found to be a fault with armatures of the type described. The trouble is not confined entirely to the armature itself, but may also extend to the brushes and their connections, giving rise to excessive sparking and spoiling the faces of the commutator.

To attain the ends pointed out and prevent the difficulties of running armatures such as I have described in compound fields, I have devised my present invention; which consists, broadly, in varying the magnetism of the poles in greatest proximity to the armature proportionately to the increased electro-motive force generated by this proximity; and more particularly, in providing as a means of equalizing the potential of the armature a differential series winding which acts to demagnetize the pole in greatest proximity to which the armature runs; this differential winding is connected to the individual brushes and passes to the adjacent field windings, while the regular series winding in the work circuit is connected to the bus-bars and derives its current from all of the brushes, or in the case of a number of generators, from all of the various generators. In this way the increased output of any particular brush will tend to decrease the magnetic strength of the adjacent pole or poles so as to equalize the electro-motive force delivered to the various brushes around the armature. As it is necessary to decrease the intensity of the magnetism in the pole when the current in the adjacent part of the armature is augmented, the wire which leads from the brush directly to this pole must be wound differentially to the main series winding. I therefore lead from each brush or from every alternate brush a wire which makes a sufficient number of differential turns around the adjacent pole or poles, and then connect it to a common bus-bar from which current is supplied in multiple or in series to all the poles to form the ordinary series winding of the machine, as in other compound-wound generators. It will thus be seen that the differential part of the series winding is individual and corrective while the direct part is general and accumulative. Two or more generators when thus wound come within the scope of my invention; and are connected so that the main portion of their series winding is supplied equally from all the generators, while the differential series winding on each generator is supplied only with current coming from its own brushes.

In the accompanying drawing hereby referred to and made part of this specification, I show diagrammatically an embodiment of my invention as applied to two generators.

A and A' are the generators.

a, b are the bus-bars.

B, B' are the armatures of the two generators, the armature B' being represented as running true, while the armature B is supposed to have settled in its bearings or otherwise become eccentric so that it runs nearer to the two lower poles than to the two upper ones.

C, C', D, D', are poles of alternating north and south polarity, as indicated.

The windings to which I have referred are lettered respectively c, d, e, the winding from the minus brushes passing around the poles C and D, while that from the plus brushes passes around the poles C' and D'. By tracing the various circuits from the bus-bars a, b, it will be seen that the winding d is the shunt winding, e is the series winding and c is the differential series winding to which I have already referred, the shunt and the main series winding acting accumulatively to compound the machine under load, while the differential winding acts to carry out my invention, as already pointed out.

I have shown at X in the dotted lines the ordinary equalizing connection or balance wire as applied to a number of generators feeding the same work circuit, but this forms no part of the present invention, which may be applied irrespective of such a connection, except that in such a case I prefer to connect the main series winding between the balance wire and the main, while the differential winding is inserted between the armature terminal and the balance wire.

In case the eccentricity the effect of which is to be corrected is caused by the winding of the armature being greater upon one side than upon the other or by its being out of balance and therefore setting up vibrations, it is manifest that the corrective effect of the differential series winding described will follow the armature in its revolution and that each one of the poles as the armature approaches it more closely will be proportionately demagnetized by its series winding. My invention therefore contemplates the correction of this eccentricity as well as that caused by wear of the bearings or by the armature being out of center with relation to the pole pieces as a whole.

I do not claim herein the broad method of equalizing the potential of armatures, which consists in varying the inductive action of the field magnet poles in accordance with the variations in potential, as that is not my invention, which is limited to effecting such a variation as above described by a differential action.

I have been made aware by the inventor, of an application of Elihu Thomson, embodying claims substantially of the broad scope just indicated. I therefore do not aim to cover in my claims such a method as above outlined, and consider my invention subordinated to his.

What I claim as new, and desire to secure by Letters Patent of the United States, is—

1. The method of equalizing the potential of armatures running in multipolar fields, which consists in varying the magnetism of the poles in greatest proximity to the armatures proportionately to the increased electro-motive-force generated therein by such approximation.

2. In a compound multipolar dynamo-electric machine or motor and as a means of equalizing the potential of the armature, a differential series winding adapted to vary the magnetism of the poles to compensate for the greater proximity of the armature to one or more of such poles.

3. In a dynamo-electric machine, as a means of equalizing the potential of the armature, a differential winding adapted to demagnetize the poles to which the armature runs in greatest proximity, in accordance with the increased electro-motive force developed in such armature.

4. In a dynamo-electric machine having a number of pairs of poles, a multiple-wound armature, and a field-magnet provided with differential series windings, one part of such windings being connected to the individual brushes and opposing the magneto-motive force of the shunt winding, and the other part of the series winding taking current from all the brushes and assisting the magneto-motive force of the shunt winding.

5. In a multipolar dynamo-electric machine, and as a means of equalizing the potential of the armature running in such a multipolar field, a series winding connected between the armature terminal and the balance wire and wound differentially, and a main series winding connected between the balance wire and the main.

6. A plurality of armatures connected in multiple and supplying current of constant potential to bus-bars, and having their main series windings connected in multiple and taking current in common from all the armatures, and individual series windings on the field of each generator, such individual windings taking current only from the armature of the generator upon the poles of which they are wound.

In witness whereof I have hereunto set my hand this 31st day of December, 1893.

WALTER H. KNIGHT.

Witnesses:
JOHN W. GIBBONEY,
BENJAMIN B. HULL.